Feb. 9, 1943.    H. W. BROWN    2,310,895
APPARATUS FOR DISTRIBUTING INSECTICIDES AND GERMICIDES
Filed March 9, 1940    2 Sheets-Sheet 2
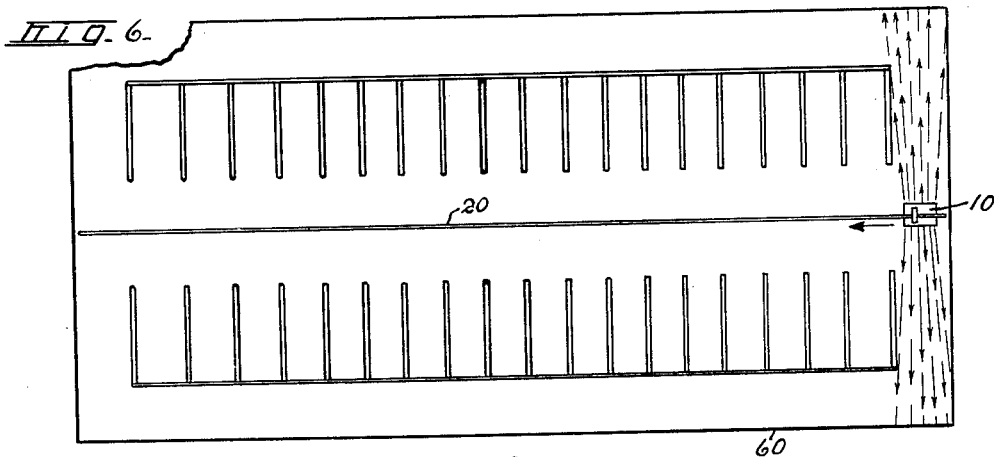
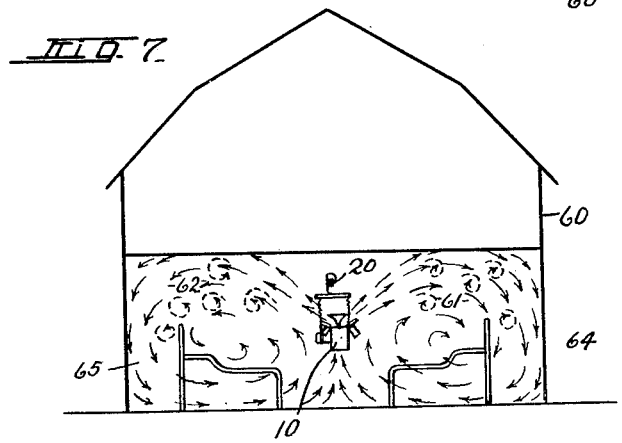
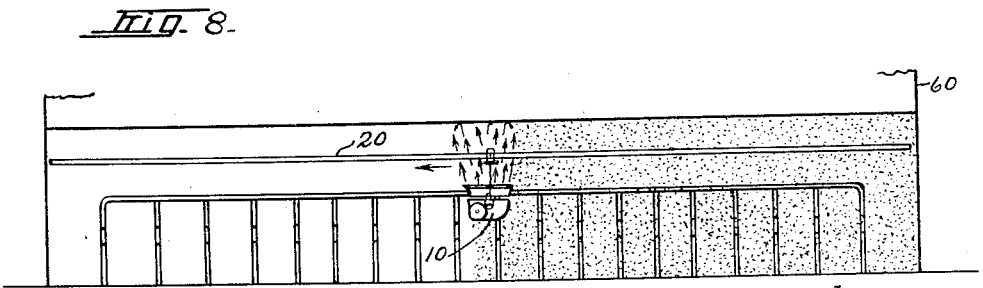
INVENTOR
HENRY W. BROWN
BY Theodore E. Simonton
ATTORNEY Patented Feb. 9, 1943

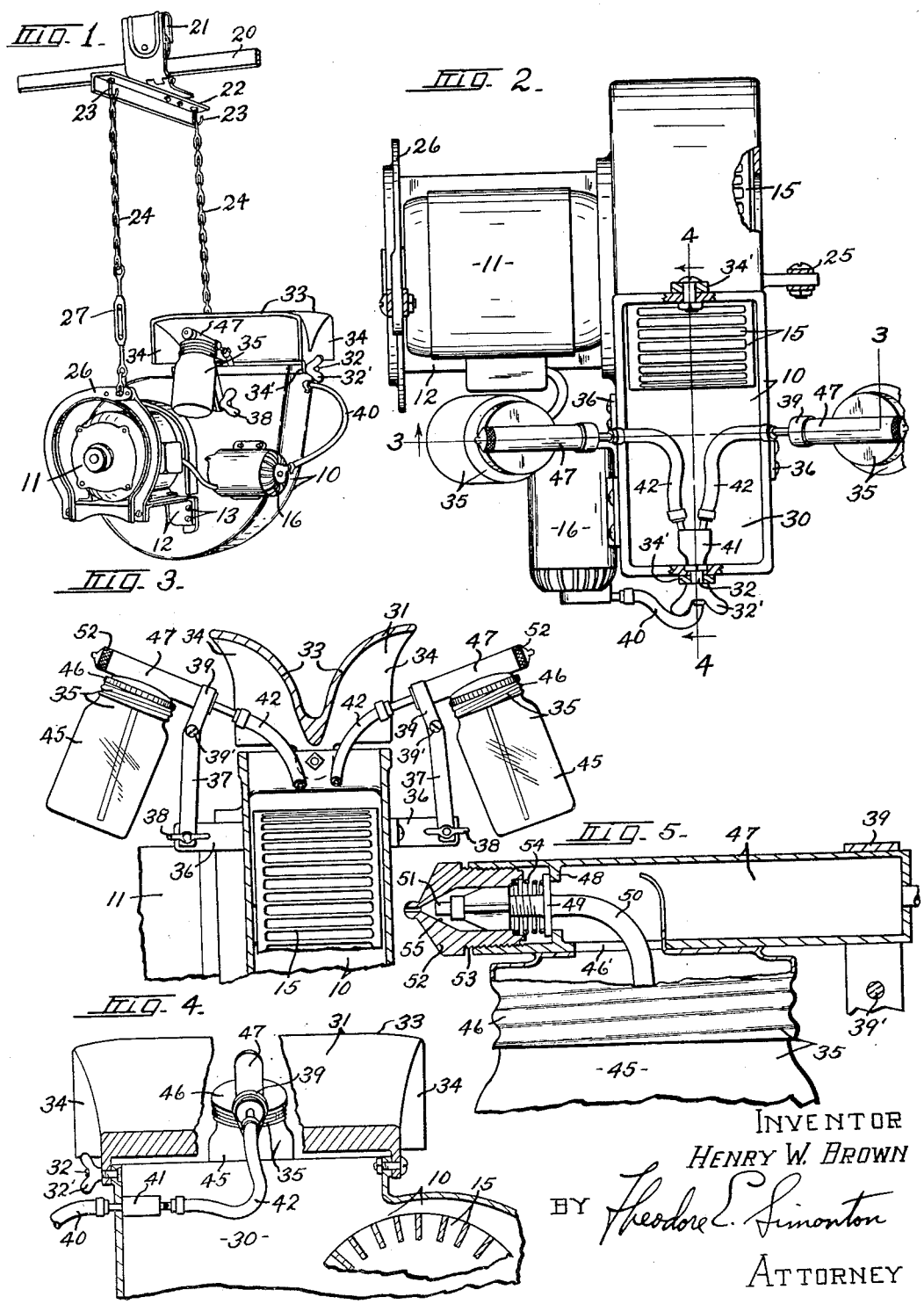

2,310,895

UNITED STATES PATENT OFFICE 2,310,895

APPARATUS FOR DISTRIBUTING INSECTICIDES AND GERMICIDES

Henry W. Brown, Syracuse, N. Y., assignor to The Brown Corp., Syracuse, N. Y., a corporation of New York Application March 9, 1940, Serial No. 323,188

2 Claims. (Cl. 261—116)

My invention relates to improvements in insecticide and germicide spraying apparatus to destroy insects in or to disinfect a cow barn, stable, poultry house or other large structure.

There are many types of sprays available for spraying insecticides to destroy flies and other annoying insects or germicides to disinfect buildings. In the type of spray most generally used, some form of air compressor is employed to create a moving air stream, a container for holding a liquid insecticide is provided and a nozzle is connected thereto for atomizing the liquid. In the common form of sprayer, the air from the compressor is used for two functions: (1) the static pressure of the air is directed on the surface of the liquid to elevate the liquid through a suitable tube and force it into the nozzle of the atomizer; and (2) the main air stream created by the compressor is passed through a Venturi nozzle in the throat of which is located the end of the insecticide tube. The passage of the air stream past the mouth of the liquid tube causes a lift to be created on the liquid to assist the pressure on the surface of the liquid in discharging liquid through the tube into the air stream. The air stream is moved at fairly high velocity and breaks up the flow of insecticide into a spray. In this type of apparatus, the air stream flowing into free air diffuses rapidly and ordinarily does not carry more than a few feet from the nozzle. Such an apparatus is fairly effective for spraying an insecticide or germicide into a small volume of free air and is likewise effective for directly spraying an animal. However, if a structure of fairly large volume is to be treated with insecticide, this method of treatment is ineffective. Since only a small part of the cubic contents of the total volume may be treated at one time, the insects fly from one part of the structure to the other and avoid the spray. Further, the task of spraying insecticide or germicide through a building of fairly large volume is laborious and time consuming.

To overcome the difficulties described above, I have developed an apparatus for diffusing atomized insecticide or germicide in an efficient and economical manner. Generally, my scheme includes creating a carrier current of air moving at a rate of the order of a thousand cubic feet per minute and upwards, and introducing into this carrier current of air an atomized spray of insecticide or germicide whereby the atomized spray is carried by the carrier current and is rapidly diffused throughout the structure to be treated in the form of a fog.

The main object of my invention is to provide an apparatus for efficiently and economically atomizing and diffusing liquid insecticide or germicide.

Another object of my invention is to provide an apparatus for atomizing and diffusing liquid insecticide or germicide which is capable of delivering dual clouds of atomized liquid.

Still another object of my invention is to provide an insecticide or germicide spray apparatus provided with an independent means for creating a carrier current of air and equipped with a control for utilizing said carrier as a single carrier current or splitting the carrier current into dual currents moving in opposite directions.

A further object of my invention is to provide an insecticide or germicide spray apparatus capable of delivering dual carrier air currents and independent liquid sprays, one for each air current, having independent control means to vary the amount of spray introduced into each carrier current.

Other objects and advantages will become apparent from the following specification and the drawings attached thereto, in which:

Figure 1 is a perspective view of my apparatus for distributing insecticide spray.

Figure 2 is a plan view, parts being broken away, of the spray apparatus.

Figure 3 is a sectional view, parts being broken away, taken on the line 3—3 of Figure 2.

Figure 4 is a sectional view, parts being broken away, taken on the line 4—4 of Figure 2.

Figure 5 is a detail section of the atomizer nozzle and part of the insecticide container.

Figure 6 is a schematic plan of a cow barn, or the like, showing the lateral distribution of insecticide from my apparatus.

Figure 7 is a vertical cross section of the structure shown in Figure 6, showing the rolling cloud of insecticide distributed by my apparatus.

Figure 8 is a longitudinal section of the structure of Figure 6, illustrating the method of progressing the spray apparatus through the structure to trap and destroy insects.

Referring now to the drawings, 10 is a blower of a well known type, capable of moving a large volume of air of the order of 1000 cubic feet a minute. An electric motor 11 is supported on a suitable bracket structure 12 which is fastened to the side of the blower 10 by suitable means such as studs 13. The motor 11 is directly connected to the blower impeller 15. A small unitary electrically driven air compressor 16, for example, one capable of producing a pressure of the order of ten pounds per square inch, is fastened to the side of the main blower 10 and is used for a purpose presently to be described. The entire apparatus is supported on a movable carriage to make the machine portable.

In the majority of cow barns a manure track is provided running the length of the barn. Where such a manure track is available, I prefer to use a carriage as illustrated in Figure 1. The track is represented by the bar 20. A trolley hanger 21, adapted to run on the track 20, has fastened to it an angle bar 22 which is disposed at right angles to the track 20. A pair of hooks 23 are set in the angle bar 22 a suitable distance apart to suspend chains 24. The lower ends of the chains 24 are suitably fastened to the spraying apparatus, one being attached to the blower at 25, and the other chain being attached to a hanger frame 26 which is in turn secured to the bracket structure 12. A turn buckle 27 may be provided in one of said chains to allow trimming the machine.

At the discharge 30 of the blower 10, a splitter 31 is rotatably mounted by means of bolts 32 and thumb screws 32'. By loosening the thumb screws 32' the splitter 31 may be tilted to one side or the other of the blower discharge 30 to direct the flow of air from the blower. When the splitter 31 is in the central position the air from the blower 10 is equally divided and discharged into two currents flowing away from each other in opposite directions. In the preferred form, the discharge 30 of blower 10 is directed upwardly. The splitter is therefore horizontal and in the central position deflects the air stream substantially horizontally. If the splitter 31 is tilted to one side or the other, it will change the direction of the air streams either up or down as the case may be. The splitter may also be arranged so that in the extreme tilted position it will cause the air to flow in a single stream to one side or the other.

The splitter 31 is provided with two curved vanes 33 extending substantially the length of the blower outlet 30. The vanes 33 are joined together at their lower edges and curve upwardly and outwardly from each other. End shrouds 34 are provided for the vanes 33. The end shrouds 34 are each provided with a downwardly extending tongue 34' which in turn has an aperture for receiving one of the mounting bolts 32. In the preferred form, the vanes 33, shrouds 34 and tongues 34' are formed integrally.

Two liquid atomizers 35 are provided, one being mounted on each side of the blower 10 adjacent the discharge opening 30. The mounting for each atomizer comprises a bracket 36 secured to the side of the blower. A piece 37 is rotatably secured to the bracket by means of a thumb screw 38. The upper end of the piece 37 is suitably secured to the atomizer 35, as here shown, by means of a clamp 39 and screw 39'. It is to be noted here that these mountings are adjustable so that the atomizer sprays may be directed upward or downward independently of the splitter 31.

A flexible conduit 40 has one end connected to the discharge of the compressor 16. The other end of the conduit 40 is connected to the stem of a Y-connection 41 which is here shown mounted in the end of the discharge 30 of the blower 10. Flexible conduits 42 have one end each connected to a respective branch of the Y-connection 41. The other ends of the conduits 42 are connected to the spray nozzles 45 of the atomizers 35.

The particular type of atomizer used is not important so long as it is provided with a means for controlling the spray of each atomizer independently of the other atomizer. The atomizer 35 illustrated in Figures 3 and 5 comprises a liquid container 45 which is readily separable from the cap 46 to permit loading with insecticide. The barrel 47 is permanently affixed to the cap 46 and is provided with an opening 46' communicating with the container 45. A circular inner shoulder 48 is provided as an abutment for the retaining bar 49 of the liquid tube 50. The tube 50 extends downwardly into the container 45 and is submerged in the liquid. The upper end of the tube 50 carries a liquid spray nozzle 51. The knurled head 52 is screwed into the barrel 47 by means of the thread 53. A spring 54 presses against the inner end of the head 52 and against the bar 49 to hold the tube 50 in place. As the head 52 is screwed inwardly of the barrel 47, the inner cone 55 of the head 52 approaches the nozzle 51, thus restricting the passage of air through the barrel 47. This restriction causes a differential in pressure between the surface of the liquid and tip of the nozzle 51. Liquid is thus forced through the nozzle 51 and is atomized. If the head 52 is screwed outwardly far enough, the pressure differential becomes insufficient to elevate any liquid and no spray is produced.

With a spraying apparatus of the foregoing character, the injection of the atomized liquid into the relatively large volume carrier current of air produces an extremely fine diffusion of the treating liquid, which may be an insecticide or germicide, which diffusion may accurately be described as a fog, and the resulting fog is carried for comparatively long distances from the spraying apparatus, rolling over and over and permeating into all nooks and crannies as it proceeds.

My method of distributing insecticide throughout a structure such as a cow barn is illustrated in the Figures 6, 7 and 8.

Figure 6 is a schematic floor plan of a cow barn 60 or similar structure which is provided with a suspended manure track 20 running down the center of the structure. The apparatus for distributing the insecticide is indicated schematically and identified by the number 10. The arrows projecting laterally from the apparatus 10 indicate the flow of the air currents in opposite directions across the structure from the center track 20.

Figure 7 is a schematic vertical cross section of the structure 60, the spray distributing apparatus 10 being shown suspended from the manure track 20. The arrows indicate the direction of flow of the air currents, illustrating the method of distributing the insecticide by creating a current of air which is divided into two parts, indicated as 61 and 62, which flow substantially oppositely to each other and laterally of the structure, the flow being upward from the apparatus 10 to the ceiling of the structure, thence outwardly to the side of the structure, then downwardly and inwardly adjacent the floor of the structure. These currents actually short circuit to some extent so as to form a rolling current of air, as indicated by the broken arrowed lines. Thus, the currents 61 and 62 which carry the insecticide spray, thoroughly permeate the structure from side to side of the center.

Figure 8, which is a partial vertical longitudinal section of the structure 60, indicates how the apparatus 10 is advanced throughout the length of the structure, starting at one end and proceeding toward the opposite end. The stippled part of the figure indicates a fog of insecticide created by the apparatus 10 which substantially fills the structure to be treated by insecticide. As the apparatus 10 is advanced longitudinally of the structure, insect life will be trapped between the advancing fog of insecticide and the opposite end of the structure. Since the apparatus 10 is moving large quantities of air, for example from one thousand cubic feet per minute upwardly, the entire structure may be filled with the fog of insecticide before that part of the cloud which is created first has had time to settle out of the air. Thus, with the entire atmosphere of the structure treated, all insect life within the structure is exposed to the insecticide with the result that a very high percentage of such insect life is destroyed.

It is to be noted from Figure 7 that the rolling cloud of insecticide which is directed upwardly along the ceiling downwardly along the side walls and inwardly adjacent the floor of the structure will also completely treat any cattle which may be in the structure at the time. The rolling cloud will deposit insecticide on the backs of the cattle on the outward direction of movement and, as it rolls inwardly adjacent the floor, will deposit insecticide upon the underside of the cattle. Since the insecticide is atomized and the atomized stream injected into the carrier air current, the rolling air current carries the insecticide in very finely divided particles so that although the cattle may be completely covered with insecticide the deposit is in such a light fog that it is not injurious to the cattle in any way. Likewise, because of the thorough mixing of the atomized insecticide with the carrier air current, complete treatment of the atmosphere within the structure is accomplished with a minimum amount of liquid insecticide. I have found that in using my method, I can successfully exterminate insect life within a structure and in so doing use from one-third to one-half as much insecticide as would be required to accomplish a comparable result by the ordinary method.

Where the structure is not provided with a central aisle or means for progressing the spray apparatus along the center of the structure, treatment is accomplished by advancing the apparatus 10 first down one aisle adjacent one side as 64 and then down the aisle along the opposite side 65. In treating a structure in this manner, the air splitter 31 is adjusted so as to throw the major portion of the air current inwardly toward the center of the structure, a small portion of the current being thrown outwardly toward the side wall in order to thoroughly treat the atmosphere. If the structure is not too wide, complete treatment of the atmosphere may be obtained in this way, the main current following the same general direction as indicated by the currents 61 and 62, but where only one current is operating at one time.

Although I have shown and described a specific embodiment of my invention, it is obvious that modifications can be made by those skilled in the art and I, therefore, wish to be limited only by the scope of the appended claims.

I claim:

1. An insecticide or germicide spray apparatus adapted to diffuse a spray liquid in the form of a fog, comprising a blower having a casing and an elongated discharge outlet and adapted to move a relatively large volume of air, air dividing and distributing means pivotally mounted on said casing adjacent said blower outlet and comprising two curved vanes joined together back to back along one edge and curving outwardly away from each other towards their free ends, the joined edge of said vanes being arranged longitudinally and centrally of said blower outlet, whereby two carrier air currents are produced flowing substantially oppositely to one another, two atomizers for spray liquid mounted adjacent each side of said blower outlet to discharge atomized spray into each of said two carrier air currents, and means separate from said blower for producing air under relatively high pressure for said atomizers.

2. An insecticide or germicide spray apparatus adapted to diffuse a spray liquid in the form of a fog, comprising a blower having a casing and an elongated discharge outlet and adapted to move a relatively large volume of air, air dividing and distributing means pivotally mounted on said casing adjacent said blower outlet and comprising two curved vanes joined together back to back along one edge and curving outwardly away from each other towards their free ends, the joined edge of said vanes being arranged longitudinally and centrally of said blower outlet, whereby two carrier air currents are produced flowing substantially oppositely to one another, two atomizers for spray liquid adjustably mounted one on each side of said blower casing adjacent said blower outlet to discharge atomized spray into each of said two carrier air currents, means separate from said blower for producing air under relatively high pressure for said atomizers, and independent control means associated with each of said atomizers for controlling the amount of atomized liquid injected into said two carrier air currents.

HENRY W. BROWN.